June 4, 1929.  J. REID  1,716,088
BAND WHEEL POWER
Original Filed July 13, 1923  3 Sheets-Sheet 1
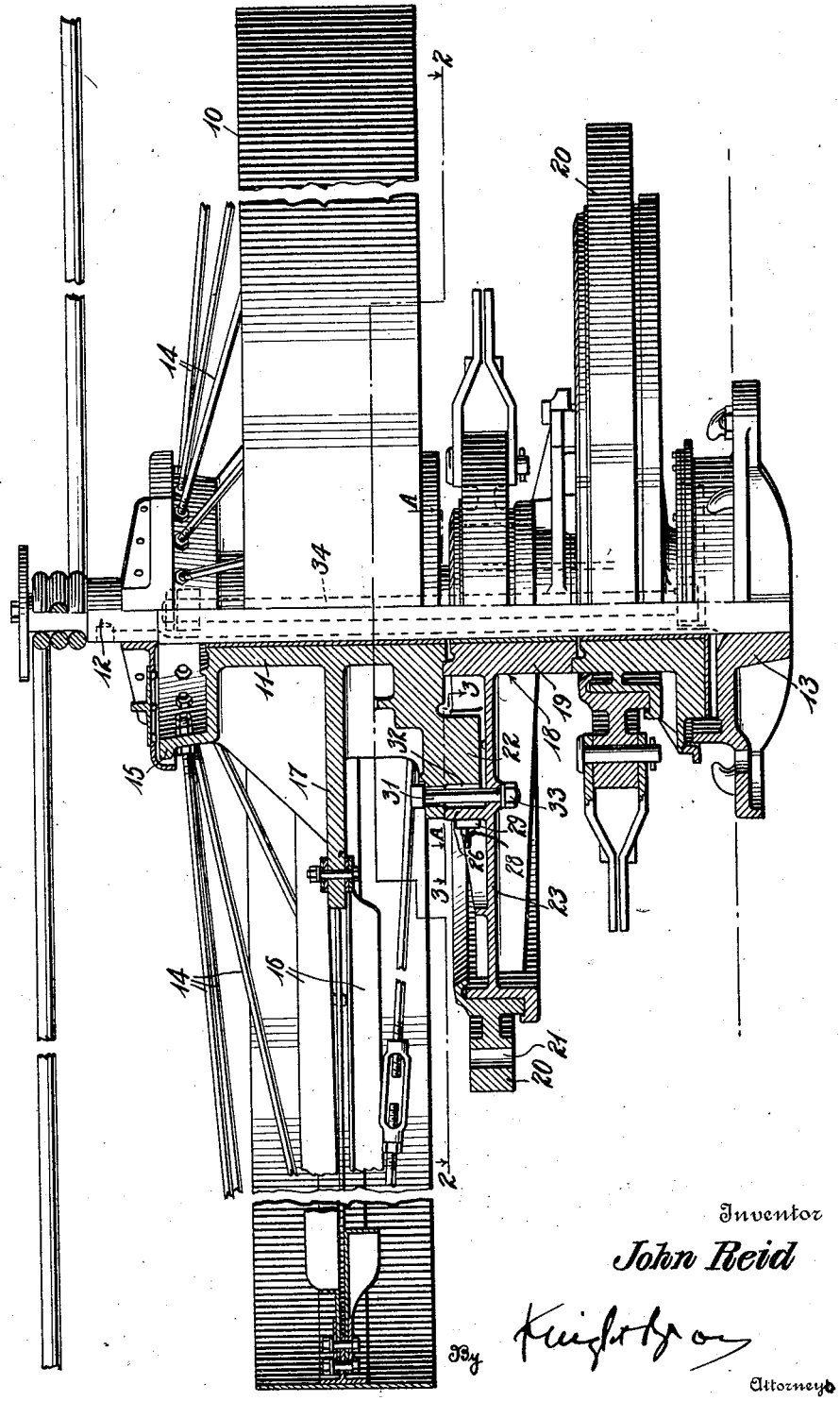
Inventor
John Reid
By [signature]
Attorneys

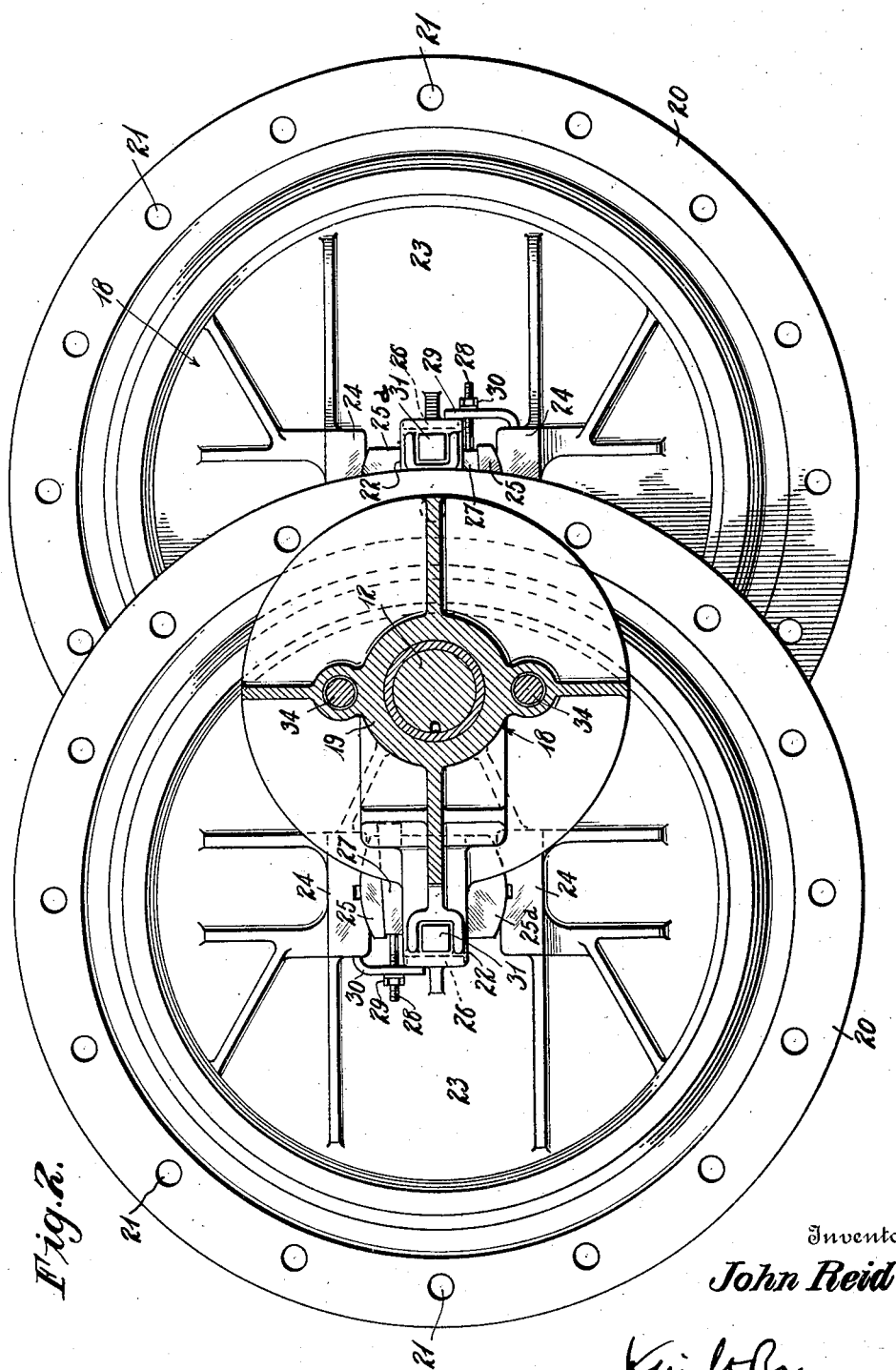

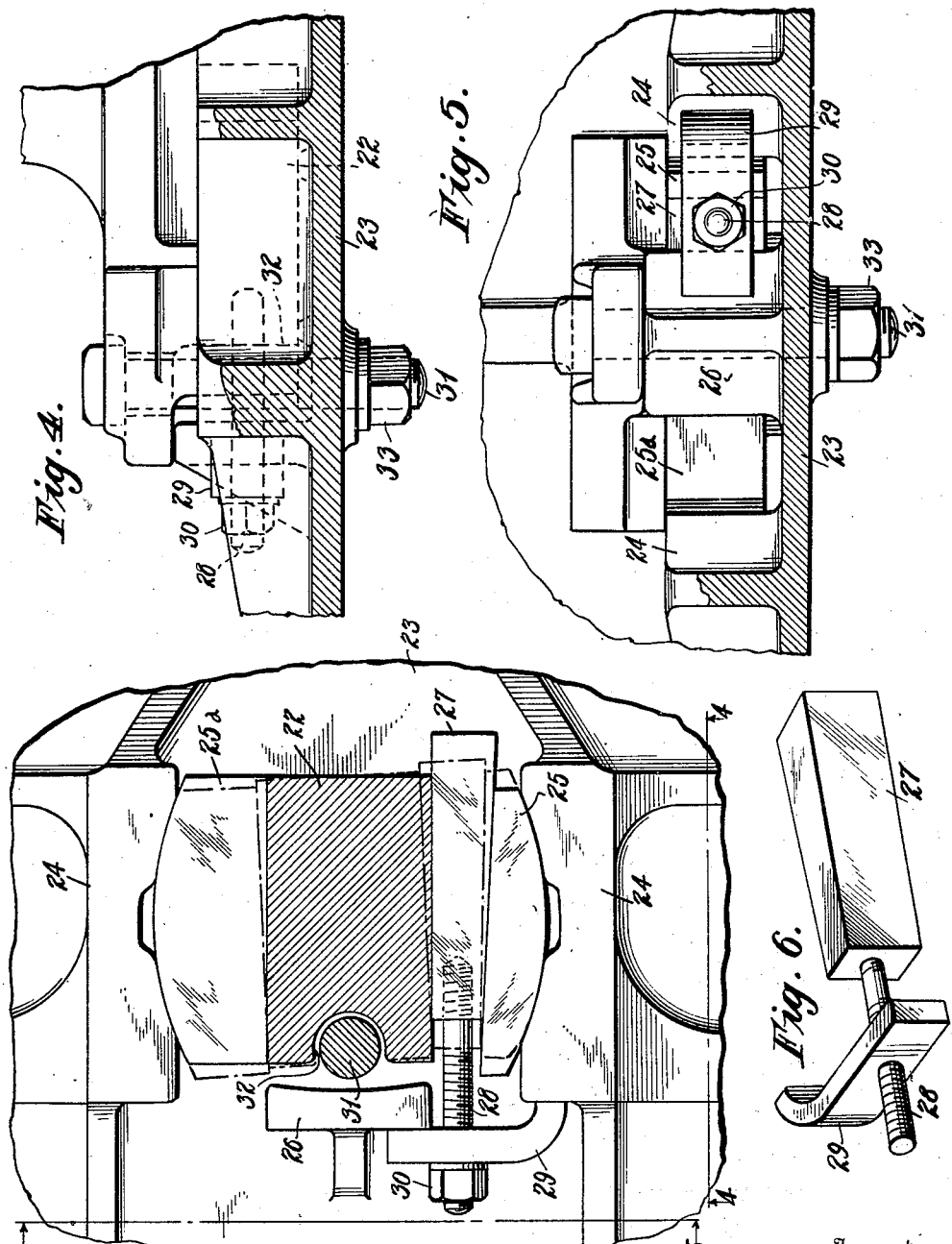

Patented June 4, 1929.

1,716,088

UNITED STATES PATENT OFFICE.

JOHN REID, OF OIL CITY, PENNSYLVANIA, ASSIGNOR TO JOSEPH REID GAS ENGINE COMPANY, OF OIL CITY, PENNSYLVANIA.

BAND-WHEEL POWER.

Application filed July 13, 1923, Serial No. 651,411. Renewed November 16, 1927.

This invention relates to band wheel powers and has for its particular object the provision of means for locking the eccentrics to the power wheel.

Devices of this character are employed for developing from a single source of power reciprocating movements in a plurality of connections extending in different radial directions outwardly, to a corresponding number of pumps or other work. The power is derived from eccentrics adapted to be rotated with the power wheel, it being common practice to mount on these eccentrics, eccentric rings normally non-rotatable, to which the power transmitting rods are connected.

These power wheels as usually constructed are of relatively large dimension, it being quite customary to construct the band wheel in sizes ranging from 16 to 24 feet in diameter. The eccentrics and the hub of the band wheel are mounted on a common vertical axis and in assembling the device, means must be provided for anchoring or locking these eccentrics to the power wheel so that they will rotate therewith. It is essential that the connection between the parts be positive with sufficient rigidity to prevent any relative movement owing to the excessive strains and stresses to which the parts are subjected in use, which would in the case of a faulty connection, result in a relative movement or back-lash, which would be highly objectionable and disastrous.

Furthermore, in constructing mechanisms of this character in which interlocking parts must be formed it has been found that despite the exercise of reasonable care, the cooperating parts are not always in alignment thus making it difficult and in many instances, impossible, to produce the rigidity and effective connection of the parts so necessary and desirable.

It is therefore an object of my invention to provide means for interlocking the several rotating parts of a band wheel power the construction of which insures the rigidity and stability of the device when completely assembled.

Another object of my invention is to effectively compensate for any disalignment or imperfections in the formation of the interlocking parts whereupon the desired rigid connection of the parts may be accomplished notwithstanding.

Another object of my invention is to provide an arrangement of this character which is simple in construction, efficient in operation and may be cheaply and durably manufactured and assembled in the field without necessitating the services of a skilled mechanic.

Other objects and advantages of my improved construction will be made more apparent as this description proceeds, especially when considered in connection with the accompanying drawings, wherein, Fig. 1 is a view partly in section and partly in elevation of a band wheel power constructed in accordance with my invention, Fig. 2 is a fragmentary enlarged sectional view taken substantially on the plane indicated by line 2—2 in Fig. 1, Fig. 3 is a fragmentary enlarged detail view taken substantially on the plane indicated by line 3—3 in Fig. 1, looking in the direction of the arrows, Fig. 4 is a sectional view taken substantially on the plane indicated by line 4—4 in Fig. 3, Fig. 5 is a sectional view taken substantially on the plane indicated by line 5—5 in Fig. 3, and Fig. 6 is a perspective view of one of the constructional details.

Referring now more particularly to the drawings wherein like reference characters indicate like parts, the general construction of the type of band wheel power herein illustrated will be described. In constructing the power there is provided a rim 10 having a hub 11 mounted to rotate on a shaft 12 projecting from the base 13. Tension spokes 14 extend from a hub flange 15 radially and downwardly and are suitably connected to the rim 10. Similar spokes although less in number are provided which extend radially and upwardly from the hub 11 and are connected to the rim 10. Circumferentially rigid trussed spokes 16 are connected to radial arms 17 at their inner ends and at their outer ends to a flange formed on the rim. All of this construction is substantially, although not necessarily, the same as that described in U. S. Letters Patent 1,072,028 granted September 2nd, 1913, to Wilbur O. Platt.

Arranged to rotate around the shaft 12 are one or more eccentrics 18, each provided with a hub portion 19 and a flanged rim adapted to receive the eccentric ring 20, provided with a plurality of apertures 21, whereby connection is made with any number of power transmitting rods. In practice, the eccentrics 18 are locked to rotate with the power wheel while the eccentric rings 20 are nonrotatable, thus developing a reciprocatory movement which is transmitted to the power transmitting rods.

This invention has particularly to do with means for locking the eccentrics so as to rotate with the power wheel and to this end there is formed on the hub 11 of the power wheel a downwardly presented locking segment or projection 22 arranged to one side of the axis of the power wheel. This segment or projection 22 projects below a plane indicated by the line A—A, bearing surfaces for the hub 11 being provided which are aligned on this line A—A. In boring the hub 11 to receive the shaft 12, these bearing surfaces may be turned or formed in a true plane at right angles to the vertical axis. The opposed portions of the body 23 of the eccentric are also formed in a true plane at right angles to the vertical axis of the machine when the hub 19 of the eccentric is bored to receive the shaft 12. Therefore in assembling the device the alignment of the parts is facilitated and the rigidity of the structure insured by the intimate and true engagement of these surfaces.

The body 23 of the eccentric 18 is formed with portions cooperating with the segment or projection 22 for locking the eccentric to the hub of the power wheel. These cooperating portions consist of upstanding projections or walls 24, (see particularly Figs. 2 and 3) the opposed faces of which are arcuately curved in a horizontal plane, the surface of these walls being adapted to engage in an abutting relation, segmental filler blocks 25, 25ᵃ. An additional upstanding abutment or wall 26 is provided arranged at right angles to the walls 24.

Cooperating with the parts thus far described is a wedge member 27 having associated therewith either integrally connected thereto or separately but rigidly attached, a threaded extension 28. A bridge-piece 29 apertured to receive the extension 28 is provided, adapted to engage with its ends the wall 26 and either of the side walls 24, depending upon its position which in turn is influenced by the convenience in assembling. A nut 30 threadedly engaging the end of the extension 28 bears against the bridge member 29 for drawing the wedge member 27 between the extension 22 and the segmental filler block 25 with the obvious result that the parts are locked securely and rigidly in the manner illustrated in Fig. 3.

For further locking the parts, mainly against any relative vertical displacement there is associated with the locking member just described a tie-bolt 31 which passes downwardly through the extension of the hub 11, an arcuate recess 32 formed in the segmental locking portion and through the body 23 of the eccentric 18 where it receives a nut 33. Thus after the parts have been locked in place by the wedge member 27 they may be tied together to prevent any relative vertical displacement by the bolt 31.

The eccentric 18 arranged immediately adjacent the power wheel is formed, preferably on the side diametrically opposed to the projection 22 of the power wheel hub with a similarly arranged downwardly extending locking projection or segment adapted to cooperate with similarly shaped and arranged walls 24 and 26, extending upwardly from the lower eccentric and cooperating with similarly formed filler blocks 25, 25ᵃ and wedge 27 for locking the parts together. This structure is shown generally in Figs. 1 and 2 and inasmuch as the details of construction are identical with those already described, further detailed description and illustration is thought unnecessary. Obviously, however, with the upper eccentric locked to the hub of the power wheel and the lower eccentric locked in a similar manner to the first eccentric both eccentrics will rotate in unison with the power wheel. It is also obvious that additional eccentrics may be provided with the locking extensions or segments 22 formed alternately on either side of the vertical axis of the machine whereupon all of these eccentrics may be securely and rigidly locked for rotation with the power wheel.

In assembling the device the eccentrics are arranged on the shaft 12 as clearly shown in Fig. 1, each of the eccentrics 18 as well as the hub 11 of the power wheel being provided with horizontal bearing surfaces indicated by the line A—A, which surfaces engage and cooperate to vertically align the parts. There are then inserted through the assembled structure tie-bolts 34 illustrated in dotted lines in Fig. 1 and in full lines in Fig. 2, which tie-bolts may be made of sufficient length to pass through any number of eccentrics thus rigidly uniting the entire structure by reason of the true engagement of the aforesaid aligned bearing surfaces. After the device has been assembled as just described the filler blocks 25 which have previously been arranged between the locking segment or projection 22 and the walls 24 are adjusted so as to compensate for any angular irregularity of the locking segment. That is, should the locking segment 22 be disposed with reference to the cooperating parts of the eccentric with an angular irregularity as indicated in dotted lines in Fig. 3, then the filler blocks 25, 25ᵃ would be shifted to cause the faces thereof opposed to the locking projection 22 and the wedge member 27 to align therewith, so that the parts could be securely locked when the wedge member is moved to operative position by tightening the bolt 30. Thus it is possible to accurately align the cooperating members of the locking device and to compensate for any irregularity of alignment of the parts which might result from faulty manufacture or careless assembling. Obviously, after the wedge member 27 has been tightened the parts will be tied together by means of the bolt 31.

The structure herein described offers the possibility of associating with and rigidly connecting thereto a band wheel power and any number of eccentrics, the structure after assembling presenting sufficient rigidity and unity of construction as to withstand successfully the strains and stresses imparted thereto during operation. The arrangement offers the further possibility of affording means of disengageably interlocking the several units of the band wheel power in a simple, convenient and efficient manner, enabling the work to be done in the fields where the powers are assembled without necessitating the aid of a skilled mechanic. Furthermore the replacement of broken and mutilated parts is made possible without necessitating a suspension of operations for long periods as the parts may be quickly and easily replaced.

While the invention has been described herein as associated with one particular type of band wheel power it will be obvious to those skilled in this art that the type of band wheel power herein shown is for illustrative purposes only and that the invention may be associated with various types of band wheel powers now in commercial use without departing from the spirit and scope of the invention. To this end reservation is therefore made to make such changes in the association of the device and in the details of construction as may come within the purview of the accompanying claims.

Furthermore, it should be understood that the present invention is applicable to powers involving operating gearing other than a gearing including a band wheel. Therefore I do not wish to be unnecessarily limited to the illustrated example of the invention herein described, wherein a band wheel power is illustrated.

Having thus described my invention, what I claim is:

1. In a power transmission apparatus in combination, a driving member and eccentric, cooperating parts carried respectively by the hub of the driving member and eccentric and slidably adjustable locking means engaging said parts.

2. In a power transmission apparatus the combination with a driving member and eccentric mounted for rotation about a common axis, of opposed oppositely extending locking portions formed respectively on said driving member and eccentric, adjustable filler members interposed between said locking portions and means for securing said portions and members in locked relation.

3. In a power transmission apparatus the combination with a driving member and eccentric mounted for rotation about a common axis, of opposed oppositely extending locking portions formed respectively on said driving member and eccentric, adjustable filler members interposed between said locking portions and wedging means for securing said portions and members in locked relation.

4. In a power transmission apparatus the combination with a driving member and a plurality of eccentrics arranged in an axial series for rotation about a common axis, locking projections carried by each member of the series and engaging the projections on the adjacent member or members and alternately arranged on both sides of the axis of rotation, and wedging means for securing said projections in locked relation.

5. In a power transmission apparatus the combination with a driving member and a plurality of eccentrics arranged in an axial series for rotation about a common axis, locking projections formed on each member of the series and engaging the projections on the adjacent member or members, adjustable filler blocks arranged between said projections and means for securing said filler blocks in locked relation.

6. In a power transmission apparatus the combination with a driving member and eccentric mounted for rotation about a common axis, of two sets of opposed oppositely extending locking abutments formed respectively on said driving member and eccentric, filler members interposed between the opposed surfaces of said locking abutments, said filler members and one set of said locking abutments having complementary curved contact surfaces to permit angular adjustment, and means for securing said parts in locked relation.

7. In a power transmission apparatus the combination with a driving member and eccentric mounted for rotation about a common axis, of interengaging spaced abutments carried by the driving member and eccentric respectively, and filler means interposed between the abutments and including a wedge.

The foregoing specification signed at Oil City, Pa.

JOHN REID.